United States Patent [19]

Kijima et al.

[11] Patent Number: 4,529,221
[45] Date of Patent: Jul. 16, 1985

[54] VEHICLE REAR SUSPENSION MECHANISM

[75] Inventors: Takao Kijima; Jiro Maebayashi, both of Hiroshima, Japan

[73] Assignee: Mazda Motor Corporation, Hiroshima, Japan

[21] Appl. No.: 489,551

[22] Filed: Apr. 28, 1983

[30] Foreign Application Priority Data

Apr. 30, 1982 [JP] Japan .................................. 57-73988
Apr. 30, 1982 [JP] Japan .................................. 57-73989
Apr. 30, 1982 [JP] Japan .................................. 57-73990

[51] Int. Cl.³ .......................... B60G 3/26; B60G 7/00
[52] U.S. Cl. .................................... 280/701; 180/73.1; 267/20 R; 280/689; 280/690
[58] Field of Search ............... 280/701, 675, 674, 673, 280/690, 688, 689, 660–671; 267/20 R; 180/73 R

[56] References Cited

U.S. PATENT DOCUMENTS

| | | | |
|---|---|---|---|
| 3,163,440 | 12/1964 | Vail | 280/690 X |
| 3,189,118 | 6/1965 | Arning | 180/73.1 |
| 3,883,152 | 5/1975 | de Carbon | 280/666 |
| 4,046,403 | 9/1977 | Yoshida | 280/701 |
| 4,269,432 | 5/1981 | Inoue et al. | 280/690 |
| 4,273,356 | 6/1981 | Sakata et al. | 280/675 |

FOREIGN PATENT DOCUMENTS 2089742 6/1982 United Kingdom ............... 280/690

Primary Examiner—Joseph F. Peters, Jr.
Assistant Examiner—Mitchell J. Hill
Attorney, Agent, or Firm—Fleit, Jacobson, Cohn & Price

[57] ABSTRACT

A body side support member such as the semi trailing arm of a semi trailing type rear-suspension system, the strut of a strut type rear-suspension system and the like is connected to a wheel hub for a rear tire by way of a ball joint and a pair of rubber bushings. The ball joint is positioned, as viewed from the left side of the vehicle body, in quadrant II, one of the rubber bushings is positioned in quadrant IV and the other rubber bushing is positioned in quadrant I or III on a coordinate plane having its origin on the center of the rear wheel, its abscissa on the horizontal line passing through the center of the rear wheel and its ordinate on the vertical line passing through the center of the rear wheel. The other rubber bushing in quadrant I or III is adapted to permit a rotational displacement of the wheel hub about the line connecting said ball joint and said one rubber bushing in quadrant IV, and the central axes of the bushings are directed so that the lower forward part of the rear wheel is adapted to be displaced inwardly with respect to the vehicle body.

9 Claims, 15 Drawing Figures

VEHICLE REAR SUSPENSION MECHANISM

CROSS-REFERENCE TO RELATED APPLICATIONS

The following are closely related copending U.S. patent applications:

| U.S. Ser. No. | Filing Date |
| --- | --- |
| 489,106 | April 27, 1983 |
| 489,132 | April 27, 1983 |
| 489,492 | April 28, 1983 |
| 498,433 | May 26, 1983 |
| 510,813 | July 5, 1983 |
| 513,028 | July 12, 1983 |

BACKGROUND OF THE INVENTION

1. Field of the Invention

This invention relates to a rear-suspension system for a vehicle, and more particularly to an improved rear-suspension system for a vehicle, exhibition an excellent toe-in effect.

2. Description of the Prior Art

As is well known, the rear-suspension system for a vehicle is desired to be arranged to that the rear wheels or the tires thereon are caused to toe in during travel, especially during cornering, in order to improve driving stability, driving comfort and the like. The centrifugal force exerted on the vehicle body during cornering acts on the rear-suspension as a lateral force. The tires are desired to counteract the lateral force with an increased resisting force in order to maximize the critical acceleration G in turning. The resisting force against the lateral force can be increased by causing the tires on the rear wheels to toe in to create a slip angle. By increasing the resisting force, the roadgripping force of the rear tires can be improved and the tendency to understeer can be enhanced, whereby the driving stability of the vehicle is improved. When the accelerator pedal is pushed down during cornering, a driving force is exerted on the tires, while when the accelerator pedal is released during cornering, a braking force is exerted on the tires. The tires tend to toe out upon release of the accelerator pedal which has been depressed, while they tend to toe in upon depression of the accelerator pedal. This causes the tires to toe out and in during cornering, thereby adversely affecting the driving stability of the vehicle. Further, as the rubber bushings for improving driving comfort are disposed inside the treading point of the tires, the braking forces exerted on the tires when the brake pedal is depressed or an engine-brake effect occurs cause the tires to toe out and accordingly the driving stability is lowered. This means that the driving stability is lowered as the driving comfort becomes higher since the softer the rubber bushings are, the more comfortable the vehicle is to ride in. Therefore, there is a demand for a rear-suspension system which can cause the rear tires to toe in even when braking forces are exerted thereon through operation of the brake pedal or by the engine-brake effect. The ability of the rear-suspension system to always cause the tires to toe in (This ability will be referred to as "Toe-in ability" hereinbelow.) ensures a good driving stability during cornering. The toe-in ability of the rear-suspension is also desirable from the viewpoint of the stability of the vehicle during straight travel at a high speed which is particularly required in the case of a sports car. Actually, roads are not completely flat but inherently have bumps and recesses of various sizes which act on the tires as external disturbances in various directions. Further, winds impinging upon the vehicle body in various directions also act on the tires as external disturbances in various directions, and in particular, side winds act on the tires as lateral forces. If the rear-suspension can maintain its toe-in ability even when these external disturbances are exerted on the tires, an under-steer condition of the vehicle is always ensured, whereby the vehicle can always be stabilized. The external disturbances act as the lateral force, braking force or driving force described above irrespective of their origins.

Therefore, the rear-suspension system is desired to be able to keep its toe-in ability against any one of the lateral force, braking force (during either the operation of the brake pedal or the engine-brake effect), and driving force. The lateral force is typically a thrust load produced during cornering and comprises a force acting on the treading point of the tires from outside to inside. The braking force due to operation of the brake pedal comprises a force acting on the treading point of the tires from front to rear while the braking force due to the engine-brake effect comprises a force acting on the wheel center of the tires from front to rear. The driving force comprises a force acting on the wheel center from rear to front. The four forces, the acting point thereof and the acting direction are tabulated in the following table.

| force | acting point | direction |
| --- | --- | --- |
| lateral force | treading point | outside to inside |
| brake force | treading point | front to rear |
| engine brake force | wheel center | front to rear |
| driving force | wheel center | rear to front |

In the above table and the following description, the braking force due to operation of the brake pedal and the same due to the engine-brake effect are referred to as "brake force" and "engine-brake force", respectively, in order to clearly distinguish them from each other.

There have been developed various rear-suspension systems which can keep the toe-in ability against the lateral force produced during cornering. For example, there is disclosed in Japanese Patent Publication No. 52(1977)-37649 such a rear-suspension system which utilizes three rubber bushings of different hardnesses: In West German Patent Laid Open Nos. 2,158,931 and 2,355,954 there are disclosed such rear-suspension systems in which each wheel hub is supported by way of a vertical shaft and a spring. However they are fairly complicated in structure. Further, the rear-suspension systems of the type described above cannot keep their toe-in ability against all of the four forces described above, but only against the lateral force.

SUMMARY OF THE INVENTION

In view of the foregoing observations and description, the primary object of the present invention is to provide a rear-suspension system which can cause the rear wheels to toe in against lateral forces exerted thereon during cornering as well as during a straight travel and which is simple in structure.

In accordance with the one preferred embodiment of the present invention, there can be provided a rear-suspension system which can cause the rear wheels to toe in against the brake force in addition to the lateral force.

In accordance with a further preferred embodiment of the present invention, there can be provided a rear-suspension system which can cause the rear wheels to toe in against the driving force or engine-brake force in addition to the lateral force and the brake force.

In accordance with a still further preferred embodiment of the present invention, there can be provided a rear-suspension system which can cause the rear wheels to toe in against all of the four forces described above.

The rear-suspension system of the present invention is characterized in that a body side support member a part of which is connected to the vehicle body and the wheel hub of each rear wheel are connected with each other by way of a single ball joint and a pair of rubber bushings, the single ball joint being disposed in quadrant II, one of the rubber bushings being disposed in quadrant IV and the other rubber bushing being disposed in quadrant I or III, as viewed from the left hand side of the vehicle body, on a coordinate plane having its origin on the center of a rear wheel, its abscissa on the horizontal line passing through the center of the rear wheel and its ordinate on the vertical line passing through the center of the rear wheel, said the other rubber bushing in quadrant I or III being adapted to permit a rotational displacement of the wheel hub about the line connecting said ball joint and said one rubber bushing in quadrant IV, and the central axes of said bushings being directed so that the lower forward part of the rear wheel is adapted to be displaced inwardly with respect to the vehicle body.

Said quadrants are numbered counterclockwise beginning from the upper right quadrant as viewed from the left hand side of the vehicle body and each of the quadrants should be interpreted, in this specification, to include the part of the abscissa and the ordinate separating the quadrant from the other quadrants. For example, quadrant I should be interpreted to include the right side half of the abscissa and the upper half of the ordinate.

The present invention can be applied to any type of rear-suspension system insofar as it can support the rear tires to permit them to toe in. For example, the rear-suspension systems to which the present invention can be applied include those of the semi trailing type, strut type, wishbone type and De Dion type. The term "body side support member" should be interpreted as a general term which refers to a support member mounted on the side of the vehicle body, such as a semi trailing arm in the case of a semi trailing type rear-suspension system, a strut in the case of a strut type rear-suspension system, upper and lower arms in the case of a wishbone type rear-suspension system and a De Dion tube in the case of a De Dion type rear-suspension system.

By connecting the body side support member and the wheel hub by way of a single ball joint and a pair of rubber bushings disposed as described above, and by selecting the characteristics and the position of the rubber bushings as described above the rear tires can effectively toe in when a lateral force is exerted thereon, as will be described in more detail referring to the attached drawings hereinbelow. Further, the rear tires can effectively toe in overcoming various external forces exerted thereon by further selecting the arrangement of the ball joint and the rubber bushings and, the characteristics and the position of the rubber bushings. This is accomplished through pivotal movements of the wheel hub about the vertical axis passing through the center of the ball joint, horizontal axis passing through the center of the ball joint and the line connecting the ball joint and the rubber bushing in quadrant IV which are permitted by virtue of deformation of the rubber bushings, as will be also described in more detail hereinbelow.

DETAILED DESCRIPTION OF THE INVENTION

Figure 1:
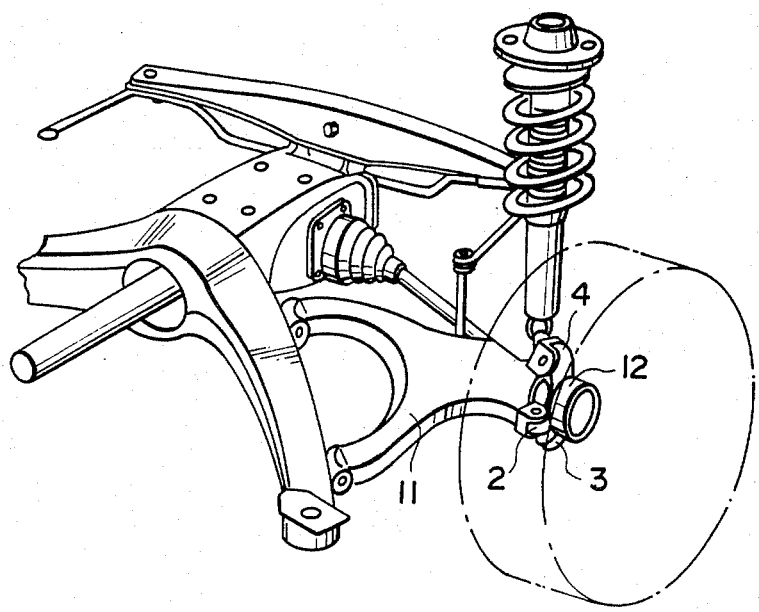
FIG. 1 is a perspective view showing a part of a semi trailing type rear-suspension system in accordance with an embodiment of the present invention.

FIG. 1 is a perspective view showing a part of a semi trailing type rear-suspension system in accordance with an embodiment of the present invention. In FIG. 1, a semi trailing arm 11 is connected to a wheel hub 12 for the left rear wheel by way of a pair of resilient bushing assemblies (sometimes referred to as rubber bushings) 2 and 3 and a single ball joint 4. The construction of a rubber bushing embodying the teachings of the present invention is discussed in greater detail hereinafter with specific reference to FIGS. 11A, 11B, 11C and 11D. In the present invention, a coordinate plane having its origin on the center of the rear wheel, its abscissa on the horizontal line passing through the center of the rear wheel and its ordinate on the vertical line passing through the center of the rear wheel is imagined as viewed from the left hand side of the vehicle body. Then the ball joint 4 is disposed in quadrant II on the imaginary coordinate plane, while one rubber bushing 3 is disposed in quadrant IV and the other rubber bushing 2 is disposed in quadrant I or III, (In the particular embodiment shown in FIG. 1, the other bushing 2 is disposed in quadrant III.) The operation of the ball joint 4 and the rubber bushings 2 and 3 will be described in detail later.

Figure 2:
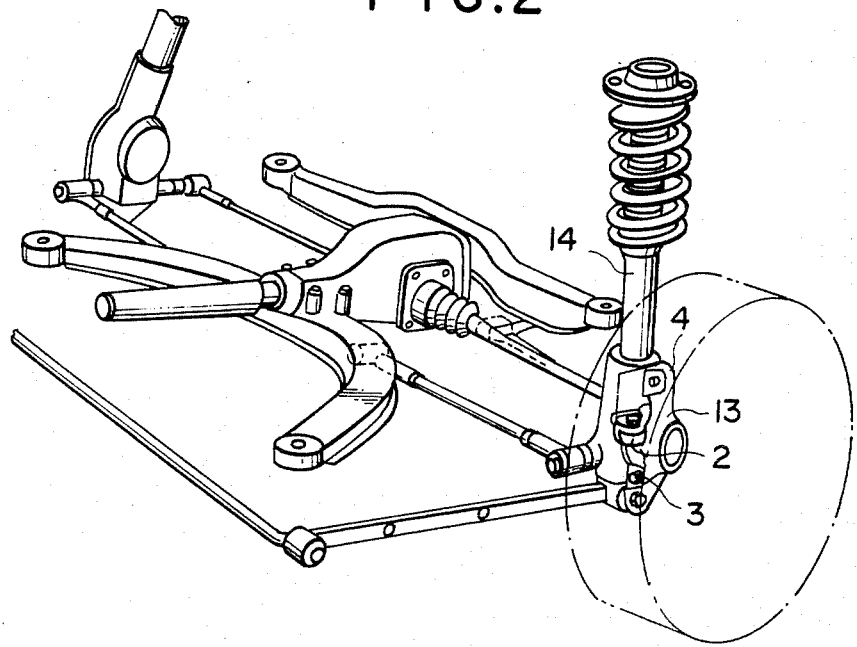
FIG. 2 is a perspective view showing a part of a strut type rear-suspension system in accordance with another embodiment of the present invention.

FIG. 2 is a perspective view showing a part of a strut type rear-suspension system in accordance with another embodiment of the present invention. A wheel hub 13 for the left rear wheel is connected to the lower end of a strut 14 by way of a pair of rubber bushings 2 and 3 and a ball joint 4 in a manner similar to that of the embodiment shown in FIG. 1. In this embodiment the ball joint 4 is in quadrant II, while one rubber bushing 3 is in quadrant IV and the other rubber bushing 2 is in quadrant III.

Figure 3:
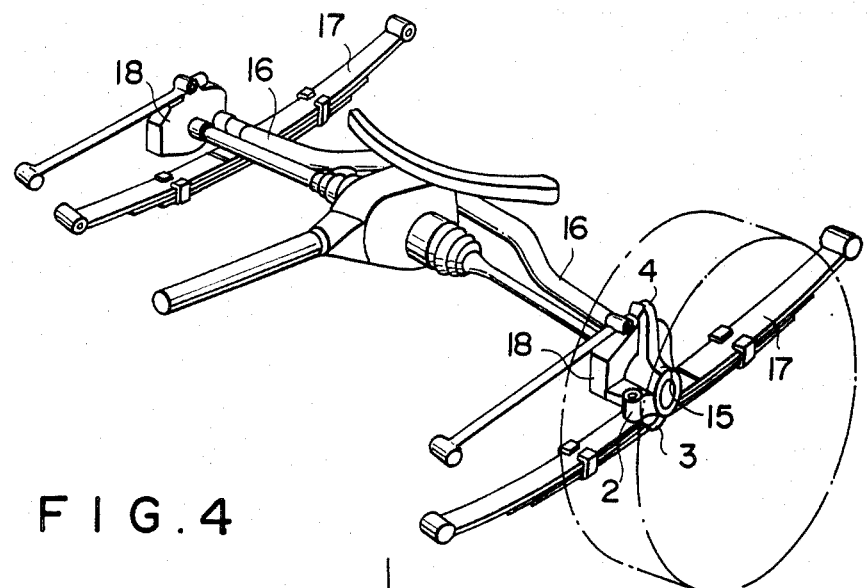
FIG. 3 is a perspective view of a part of a De Dion type rear-suspension system in accordance with still another embodiment of the present invention.

In FIG. 3, which is a perspective view of a part of a De Dion type rear-suspension system in accordance with still another embodiment of the present invention, a wheel hub 15 for the left rear wheel is connected to a bracket 18, which is mounted on an end of a De Dion tube 16 and supported by a leaf spring 17, by way of a pair of rubber bushings 2 and 3 and a ball joint 4. In this embodiment the ball joint 4 is in quadrant II, while one rubber bushing 3 is in quadrant IV and the other rubber bushing 2 is in quadrant III.

Although only the left side of the rear-suspension systems is shown in FIGS. 1 to 3, the right side of each rear-suspension system is identical to the left side. The present invention is not limited to those systems shown in FIGS. 1 to 3 and can also be applied to wishbone type and torsion beam axle type rear-suspension systems. Generally speaking, the present invention can be applied to rear-suspension systems of any type except those in which the rear wheels are rigidly mounted on a suspension arm or axle and are not permitted to toe in.

Now the principle of operation of the rear-suspension system of the present invention will be described referring to FIGS. 4, 5, 6, and 7.

Figure 4:
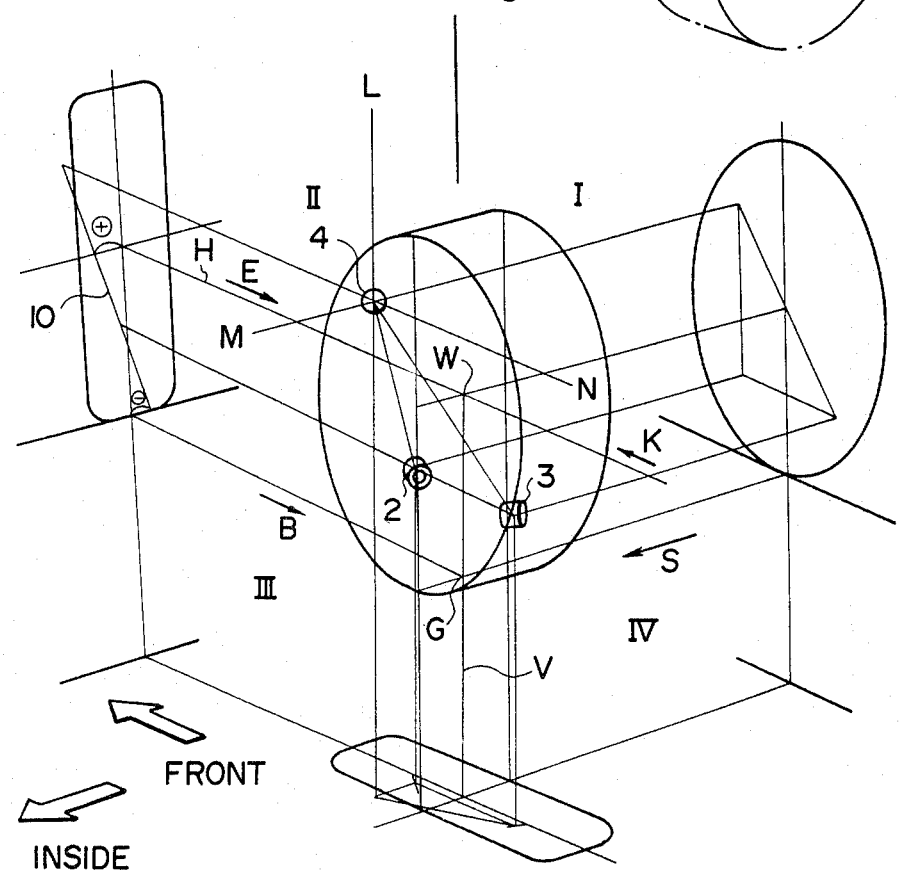
FIGS. 4, 5, 6 and 7 are schematic views for illustrating the principle of the present invention.

FIG. 4 is a combined schematic view for illustrating the principle of operation of the rear-suspension system in accordance with an embodiment of the present invention, where the ball joint 4 is positioned in quadrant II, and the rubber bushings 2 and 3 are positioned in quadrant III and quadrant IV, respectively. A schematic perspective view of the right rear tire of a vehicle as viewed from the left rear quarter is shown in the middle of FIG. 4, and projections from the rear, left side and above are positioned on the left and right sides of the perspective view and below it, respectively. In FIG. 4, the abscissa and the ordinate of said imaginary coordinate plane having its origin on the wheel center W are indicated at H and V, respectively, and quadrants I to IV of the coordinate plane are indicated at I to IV, respectively.

As described above, the lateral force acts on the treading point G of the tire from outside to inside as indicated at S, the brake force acts on the treading point G from front to rear as indicated at B, the engine-brake force acts on the wheel center W from front to rear as indicated at E, and the driving force acts on the wheel center W from rear to front as indicated at K.

In order to explain the principle of operation of the rear-suspension system of the present invention, a vertical axis L passing through the ball joint 4, a horizontal axis M passing through the ball joint 4 in parallel to the axle, and a horizontal axis N passing through the ball joint 4 in the direction of the vehicle body are imagined. Then the position of the plane including the centers of the ball joint 4 and the rubber bushings 2 and 3 with respect to the wheel center W and the treading point G must be first discussed. The plane is represented by a line 10 in the projection from the rear in FIG. 4. In other words, the line 10 represents the intersectional line between the plane including the centers of the ball joint 4 and the rubber bushings 2 and 3, and the vertical plane including the central axis of the rear wheel.

The arrangement of the ball joint 4 and the rubber bushings 2 and 3 can be classified into four cases depending on the position of the plane including their centers or the line 10 with respect to the wheel center W and the treading point G. In the first case, the relevant plane or the line 10 is outwardly offset from the treading point G at the height of the treading point G (This condition is symbolized by G− in this specification and the drawings.) and at the same time is outwardly offset from the wheel center W at the height of the wheel center W (This condition is symbolized by W−, and the first case is symbolized by G−W−.). In the second case, the relevant plane is outwardly offset from the treading point G at the height thereof (G−) but is inwardly offset from the wheel center W at the height thereof (W+). That is, the second case is symbolized by G−W+. Similarly, the third and fourth cases are symbolized by G+W+ and G+W−, respectively.

In the present invention, the ball joint 4 and the rubber bushings 2 and 3 are arranged so that the relevant plane is positioned with respect to the treading point G and the wheel center W in one of the conditions symbolized by G−W+, G−W− and G+W+ in order to cause the rear tire to toe in against the brake force B, the engine-brake force E, and the driving force K in addition to the lateral force S.

In the embodiment shown in FIG. 4, and plane including the centers of the ball joint 4 and the rubber bushing 2 and 3 (This plane will be referred to as "the plane 10", hereinbelow.) is outwardly offset from the treading point G at the height thereof and is inwardly offset from the wheel center W at the height thereof (G−W+), and at the same time the central axis of the rubber bushing 2 in quadrant III (This bushing will be referred to as the "first bushing" hereinbelow.) along which the first rubber bushing 2 is deformed most easily is inclined inwardly toward the rear in a horizontal plane, while the central axis of the rubber bushing 3 in quadrant IV (This bushing will be referred to as the "second bushing" hereinbelow.) along which the second bushing 3 is deformed most easily is inclined inwardly toward the front in a horizontal plane.

When the lateral force S is exerted on the treading point G from outside to inside, there is generated a turning moment to pivot the tire about the line connecting the ball joint 4 and the second bushing 3 so that the lower forward part of the tire is inwardly displaced and the upper rearward part of the same is outwardly displaced, through a guiding effect of the bushings 2 and 3. For this purpose and in order to permit the pivotal movement or the rotational displacement about the line, the first and second bushing 2 and 3 are arranged and oriented as described above. The tire can be thus effectively caused to toe in when the lateral force S is exerted on the treading point G. The tendency to toe-in against the lateral force S is further enhanced when the first bushing 2 is less hard than the second bushing 3.

When the brake force B is exerted on the treading point G from front to rear, a turning moment in the direction of toe-in is generated about the vertical axis L by virtue of the fact that the plane 10 is outwardly offset from the treading point G at the height thereof (G−), and at the same time a turning moment to displace the tire counterclockwisely (as seen from the left of FIG. 4) is generated about the horizontal axis M. The turning moment to displace the tire counterclockwisely is converted into a force to inwardly displace the forward part of the tire and to outwardly displace the rearward part of the same through a guiding effect of the bushings 2 and 3 due to the inclination of their central axes, thereby causing the tire to toe in together with the turning moment about the vertical axis L. This effect increases with increasing outward offset of the plane 10 from the treasing point G at the height thereof and with decreasing hardness of the bushings 2 and 3.

When the engine-brake force E is exerted on the wheel center W from front to rear, a turning moment to counterclockwisely displace the tire about the horizontal axis M is generated. This turning moment is converted into a force to cause the tire to toe in through the guiding effect of the bushings 2 and 3 as in the case of the brake force B, whereby the tire toes in overcoming a small turning moment in the direction of toe-out generated about the vertical axis L.

When the driving force K is exerted on the wheel center W from rear to front, a turning moment to displace the tire in the clockwise direction is generated about the horizontal axis M, though a small turning moment in the direction of toe-in is generated about the vertical axis L. The former turning moment is converted into a force to cause the tire to toe out through the guiding effect of the bushings 2 and 3 over coming the latter turning moment since the driving force K acts on the wheel center W in the direction opposite to the engine-brake force E. However, the tire can be caused to toe in by providing a stopper the resilient member of in front of one of the bushings 2 and 3 to limit the rotational displacement in the clockwise direction about the axis M. When the stopper is provided adjacently in front of the resilient member of one of the bushing 2 and 3, a turning moment to turn the tire in the direction of toe-in is generated about the line connecting the ball joint 4 and the bushing provided with the stopper due to the fact that the plane 10 is inwardly offset from the wheel center W at the height thereof (W+), whereby the tire is caused to toe in when the driving force K is exerted on the wheel center W.

Figure 5:
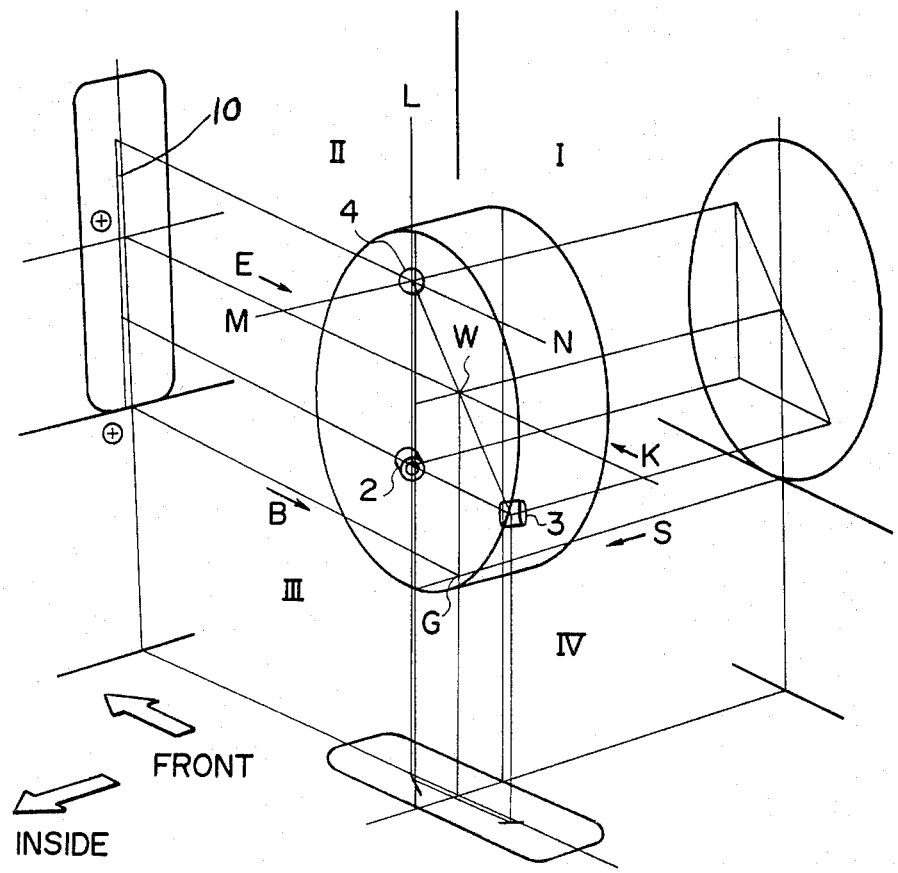

In the embodiment shown in FIG. 5, the plane 10 is inwardly offset from both the treading point G and the wheel center W (G+W+), and the first and second bushings 2 and 3 are oriented in the same manner as in the embodiment shown in FIG. 4.

In this embodiment, the tire can be effectively caused to toe in against the lateral force S by a turning moment to pivot the tire about the line connecting the ball joint 4 and the second bushing 3 in the manner similar to that in the embodiment shown in FIG. 4.

When the brake force B is exerted on the treading point G from front to rear, a turning moment in the direction of toe-out is generated about the vertical axis L by virtue of the fact that the plane 10 is inwardly offset from the treading point G at the height thereof. At the same time, a turning moment to displace the tire counterclockwisely is generated about the horizontal axis M. By converting the counterclockwise turning moment about the horizontal axis M into a force to inwardly displace the forward part of the tire and to outwardly displace the rearward part of the same through a guiding effect of the bushings 2 and 3, the tire can be effectively caused to toe in overcoming the turning moment in the direction of toe-out.

Similarly, the tire can be caused to toe in against the engine-brake force E by converting a counter-clockwise turning moment about the horizontal axis M into a force to inwardly displace the forward part of the tire and to outwardly displace the rearward part of the same through a guiding effect of the bushing 2 and 3.

Also in this embodiment, the tire can be caused to toe in against the driving force K exerted on the wheel center W by providing a stopper adjacently in front of the resilient member of one of the bushings 2 and 3 since the driving force K acts on the wheel center W in the direction opposite to the engine-brake force E as in the embodiment shown in FIG. 4. When the stopper is provided adjacently in front of the resilient member of one of the bushings 2 and 3, a turning moment to turn the tire in the direction of toe-in is generated about the line connecting the ball joint 4 and the bushing provided with the stopper due to the fact that the plane 10 is inwardly offset from the wheel center W at the height thereof, whereby the tire is caused to toe in when the driving force K is exerted on the wheel center W.

Figure 6:
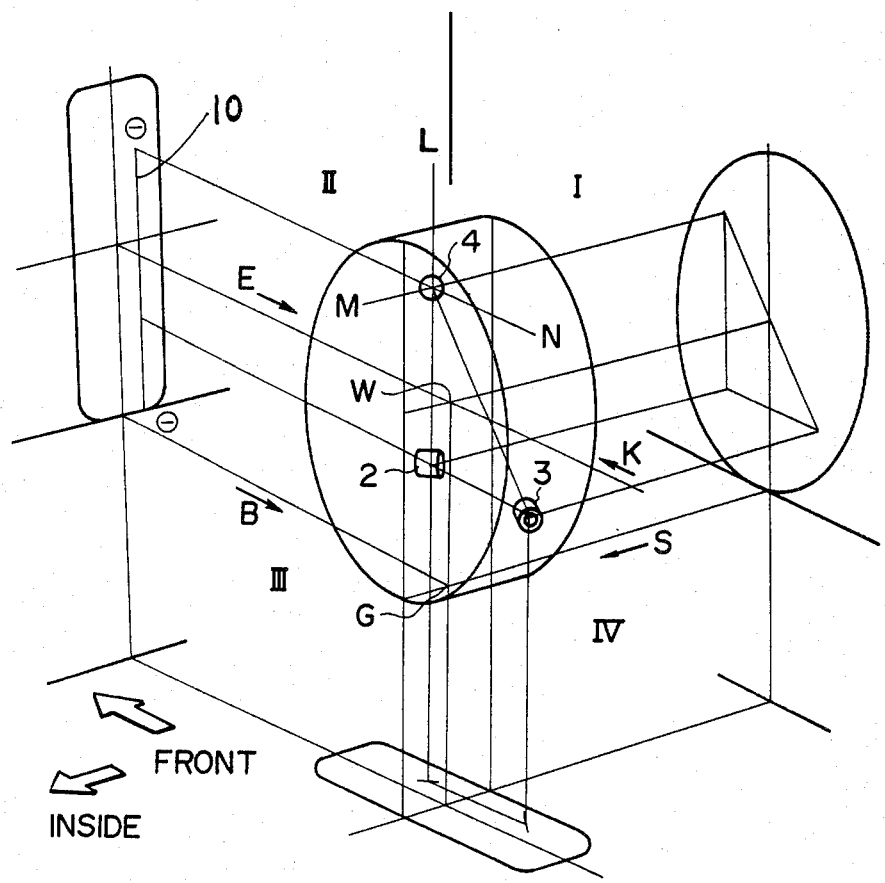

In the embodiment shown in FIG. 6, the plane 10 is outwardly offset from both the treading point G and the wheel center W (G−W−) and at the same time the central axis of the first bushing 2 is inclined outwardly toward the rear in a horizontal plane and the central axis of the second bushing 3 is inclined inwardly toward the rear in a horizontal plane.

Also in this embodiment, the tire is caused to toe in by a turning moment to pivot the tire about the line connecting the ball joint 4 and the second bushing 3 so that the lower forward part of tire is inwardly displaced and the upper rearward part is outwardly displaced.

In this embodiment a turning moment to rotate the tire in the direction of toe-in is generated about the vertical axis L by virtue of the fact that the plane 10 is outwardly offset from both the wheel center W and the treading point G when either the brake force B or the engine-brake force E is exerted on the tire. However this turning moment is converted into a force to cause the tire to toe out through the guiding effect of the rubber bushings 2 and 3 which are inclined in the direction opposite to the direction of the inclination of the two rubber bushings in the embodiment shown in FIG. 4. This can be avoided by providing a stopper adjacently behind the resilient member of one of the bushings 2 and 3. When the driving force K is exerted on the wheel center W from rear to front, there is generated a turning moment to displace the tire in the clockwise direction about the horizontal axis M which is converted into a force to cause the tire to toe in through the guiding effect of the bushings 2 and 3. Thus, by selecting the position of the rubber bushings 2 and 3, the tire can be caused to toe in even against the driving force K which acts on the tire only to cause it to toe out in the case that the plane 10 is outwardly offset from both the treading point G and the wheel center W.

Figure 7:
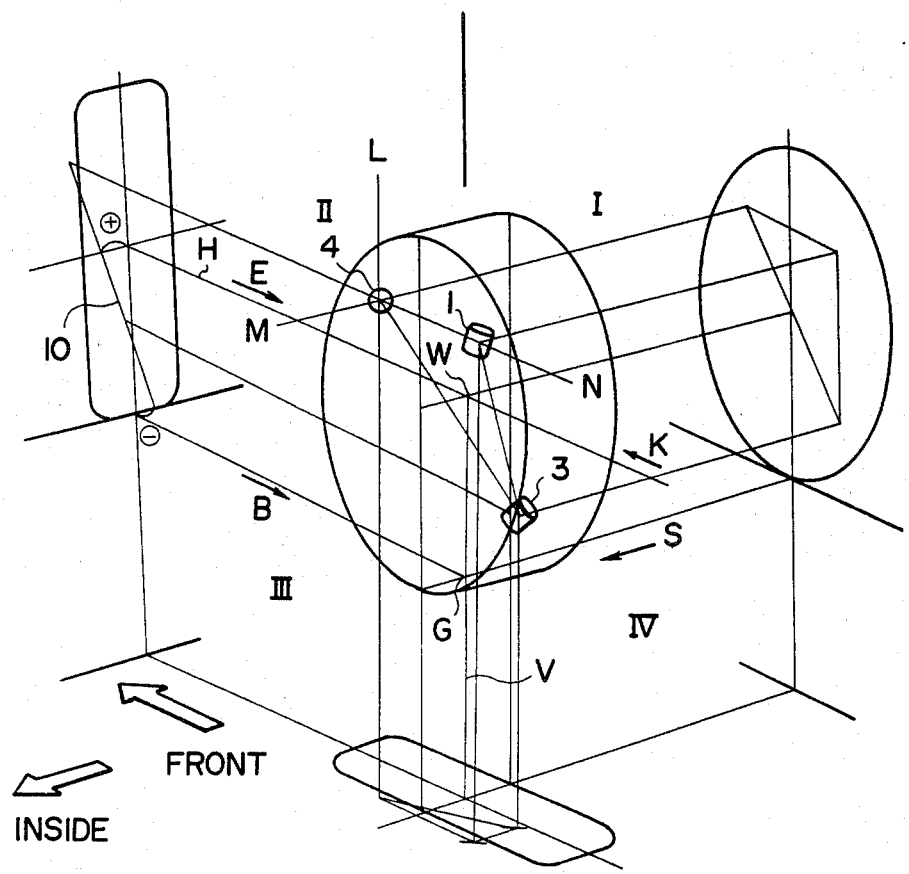

In the above embodiments, the ball joint 4 is positioned in quadrant II, and the first bushing 2 is positioned in quadrant III with the second bushing in quadrant IV. However, the first bushing 2 may be in quadrant I insofar as the second bushing 3 is in quadrant IV. Now, referring to FIG. 7, another embodiment of the present invention in which one bushing is in quadrant I and the other bushing is in quadrant IV with the ball joint being in quadrant II and the plane 10 including the centers of the ball joint and the bushings being offset from the treading point G outwardly and from the wheel center W inwardly (G−W+). In FIG. 7, the bushing in quadrant I is indicated at 1. Also in this embodiment, the lateral force S acting on the treading point G causes the tire to rotate about the line connecting the ball joint 4 and the second bushing 3 in quadrant IV in the direction of toe-in. The brake force B acting on the treading point G from front to rear generates a turning moment in the direction of toe-in about the vertical axis L by virtue of the fact that the plane 10 is outwardly offset from the treading point G at the height thereof, and at the same time generates a turning moment to counterclockwisely displace the tire about the horizontal axis M. In order to effectively cause the tire to toe in by converting the latter turning moment into a force to cause the tire to toe in, the central axis of the bushing 1 in quadrant I (which is substantially perpendicular to the line connecting the ball joint 4 and the rubber bushing 3) is inclined upwardly outwardly (In other words, the upper or front end of the bushing 1 is directed outwardly) so that the rearward part of the tire is outwardly displaced when the tire rotates about the horizontal axis M, while the bushing 3 in quadrant IV is inclined outwardly toward the rear (In other words, the upper end or the rear end of the bushing 3 is directed outwardly.) so that the rearward part of the tire is outwardly displaced when the tire rotates about the horizontal axis M.

As for the engine-brake force, the tire can be caused to toe in totally by making the force to cause the tire to toe in obtained, by virtue of the inclination of the bushings 1 and 3, from the turning moment generated about the horizontal axis M larger than the turning moment in the direction of toe-out generated about the vertical axis L due to the inward offset of the plane 10 from the wheel center W (W+). With respect to the driving force K, the tire can be effectively caused to toe in by a turning moment to cause the tire to toe in generated about the vertical axis L.

Although the plane 10 is outwardly offset from the treading point G at the height thereof and is inwardly offset from the wheel center W at the height thereof (G−W+) in the embodiment shown in FIG. 7, the tire can be effectively caused to toe in against all of the four forces in a similar manner even when the plane 10 is outwardly or inwardly offset from both the treading point G and the wheel center W (G−W− or G+W+).

Now a more practical embodiment of the present invention will be described referring to FIGS. 8 to 13. In the embodiment shown in FIGS. 8 to 13, the present invention is applied to a semi trailing type rear-suspension.

Figure 8:
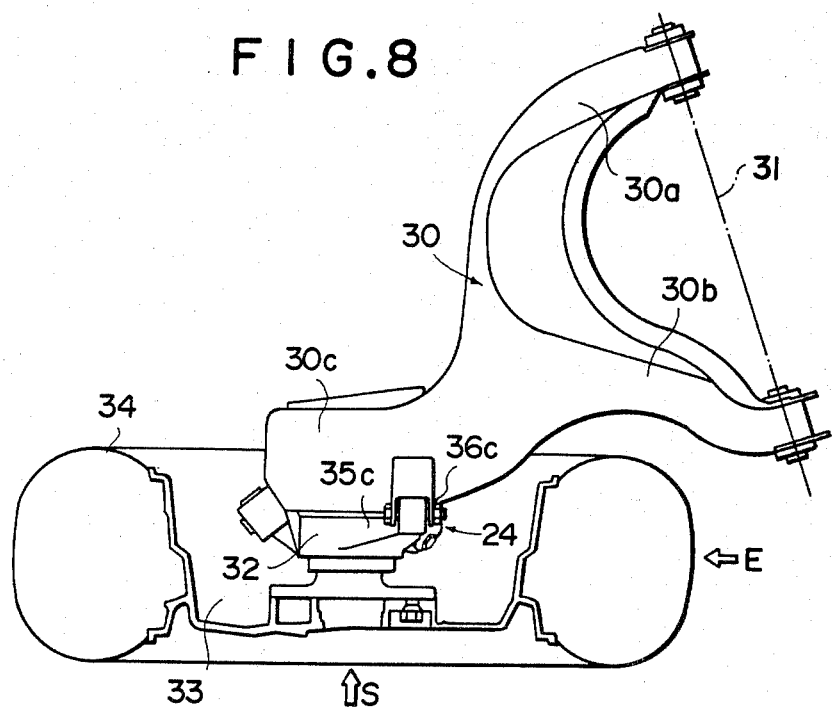
FIG. 8 is a plan view of a part of a semi trailing type rear-suspension system in accordance with a practical embodiment of the present invention, with a part of the tire cut away.
Figure 9:
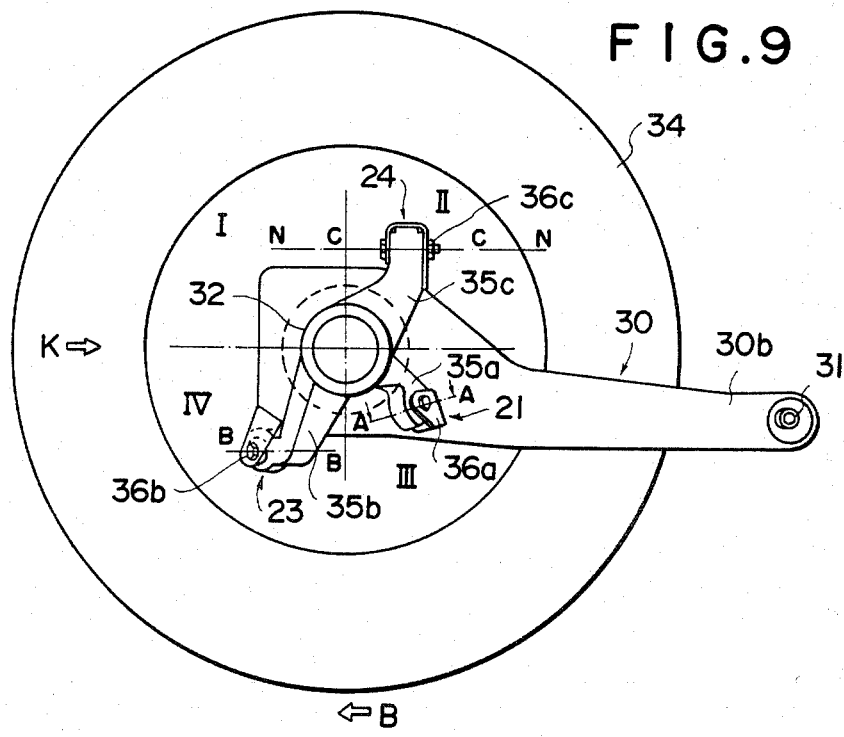
FIG. 9 is a side elevational view of FIG. 8.
Figure 10:
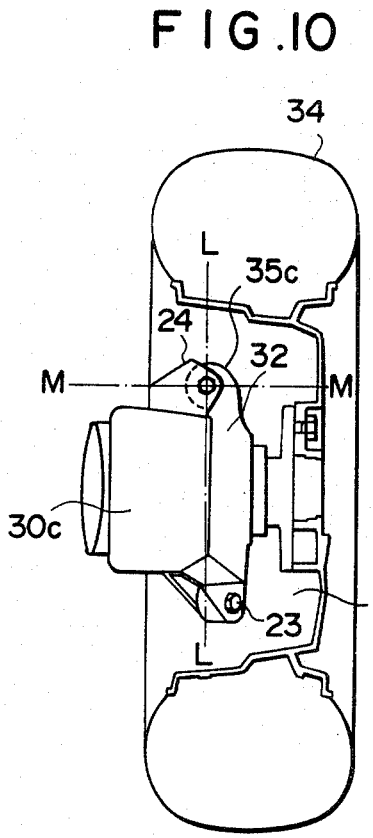
FIG. 10 is an end elevational view of FIG. 8 as viewed from the rear of the vehicle body.
Figures 11A, 11B:
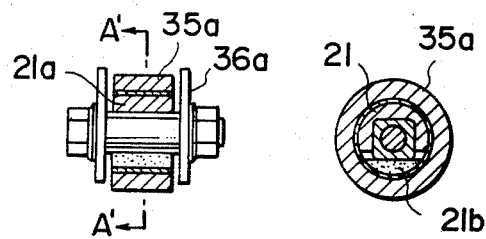
FIG. 11A is a sectional view of the first resilient bushing assembly employed in the embodiment shown in FIGS. 8 to 10.
FIG. 11B is a sectional view taken along line A'—A' in FIG. 11A.
Figures 12A, 12B:
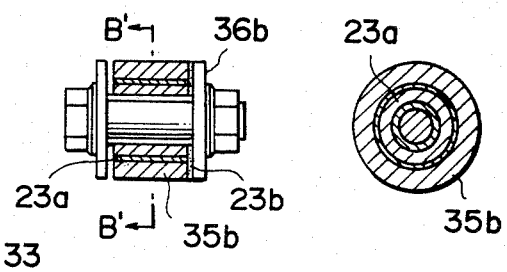
FIG. 12A is a sectional view of the second resilient bushing assembly employed in the embodiment shown in FIGS. 8 to 10.
FIG. 12B is a sectional view taken along line B'—B' in FIG. 12A.

FIG. 8 is a plan view of a part of the rear-suspension system associated with the right rear tire, FIG. 9 is a side elevational view of FIG. 8 as viewed from the right hand side of the vehicle body, and FIG. 10 is an elevational view thereof as viewed from the rear of the vehicle body. In FIG. 8, a semi trailing arm 30 has a bifurcated end forming an inner arm 30a and an outer arm 30b. The inner and outer arms 30a and 30b are mounted on the vehicle body (not shown) to pivot about a common axis 31. The other or rear end 30c of the semi trailing arm 30 is connected to a wheel hub 32 (on which a wheel 33 for the right rear tire 34 is mounted) by way of first and second resilient bushing assemblies 21 and 23 and a single ball joint 24 so that the wheel hub 32 can move about the ball joint 24 relative to the semi trailing arm 30 with a slight resiliency. More particularly, three arms 35a, 35b and 35c (FIGS. 9 and 10) are provided on the wheel hub 32. The first arm 35a is resiliently supported on the first resilient bushing assembly 21 mounted in a first bushing pivoting portion 36a provided on the rear end 30c of the semi trailing arm 30. The second arm 35b is resiliently supported on the second rubber bushing assembly 23 mounted in a second bushing pivoting portion 36b provided on the rear end 30c of the semi trailing arm 30. The third arm 35c is supported for rotation about a point on the ball joint 24 mounted in a ball joint supporting portion 36c provided on the rear end 30c. The first bushing pivoting portion 36a is positioned in quadrant III and is inclined downwardly inwardly while the second bushing pivoting portion 36b is positioned in quadrant IV and is inclined upwardly outwardly. The ball joint supporting portion 36c is positioned in quadrant II.

Figure 13:
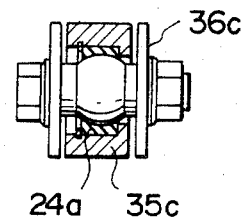
FIG. 13 is a sectional view of the ball joint employed in the embodiment shown in FIGS. 8 to 10.

The first and second resilient bushing assemblies 21 and 23 include resilient rubber members 21a and 23a, respectively, as shown in FIGS. 11A, 11B and 12A, 12B. The rubber members 21a and 23a permit displacement in the direction of their axes and a direction perpendicular to their axes. However, the rubber member 21a of the first resilient bushing assembly 21 in quadrant III is provided with a rigid material 21b on the outer side thereof so as to be permitted to deform only inwardly. The rubber member 23a of the second resilient bushing assembly 23 in quadrant IV is provided with a stopper 23b which serves to limit the forward displacement. In FIG. 13A, the stopper 23b is adjacent to and behing resilient member 23a. The stopper may also be located adjacent to and in front of resilient member 23a. The terms "behind" and "in front of" refer to the orientation of the rubber bushings within a vehicle body especially with reference to the front and rear of the vehicle body. The ball joint 24 has a spherical portion 24a which permits pivotal movement about a point but does not permit an exial displacement as shown in FIG. 13. Said third arm 35c is supported for rotation about the spherical portion 24a.

This embodiment corresponds to the embodiment shown in FIG. 4 and causes the rear tire to toe in against all of the external forces on the principle described above in conjunction with FIG. 4.

Further by relatively increasing the rigidity of the first bushing toward the outside of the vehicle body by providing the rigid material on the outer side of the first bushing, the tendency of the tire to toe-out can be prevented. The same effect can be obtained by relatively increasing the rigidity of the second bushing toward the inside of the vehicle body.

We claim:

1. A vehicle rear suspension mechanism comprising a body side support member a part of which is connected to the vehicle body, wheel hubs for supporting the rear wheels for rotation, a ball joint connecting each wheel hub to the body side support member so as to permit pivotal movement of the wheel hub about a point relative to the body side support member, and first and second resilient bushings which resiliently connect the wheel hub to the body side support member, said ball joint being positioned in quadrant II, as viewed from the left side of the vehicle body, said first resilient bushing being positioned in quadrant I, said second resilient bushing being positioned in quadrant IV on a coordinate plane having its origin on the center of the rear wheel, and its abscissa and ordinate on the horizontal line passing through the center of the rear wheel and the vertical line passing through the center of the rear wheel, respectively, said first bushing being adapted to permit a rotational displacement of the wheel hub about the line connecting said ball joint and said second bushing, and the central axes of the first and second bushings being directed so that the lower forward part of the rear wheel is adapted to be displaced inwardly with respect to the vehicle body.

2. A vehicle rear suspension mechanism comprising a body side support member a part of which is connected to the vehicle body, wheel hubs for supporting the rear wheels for rotation, a ball joint connecting each wheel hub to the body side support member so as to permit pivotal movement of the wheel hub about a point relative to the body side support member, and first and second resilient bushings which resiliently connect the wheel hub to the body side support member, said ball joint being positioned in quadrant II, as viewed from the left side of the vehicle body, said first resilient bushing being positioned in quadrant III, said second resilient bushing being positioned in quadrant IV on a coordinate plane having its origin on the center of the rear wheel, and its abscissa and ordinate on the horizontal line passing through the center of the rear wheel and the vertical line passing through the center of the rear wheel, respectively, said first bushing being adapted to permit a rotational displacement of the wheel hub about the line connecting said ball joint and said second bushing, and the central axes of the first and second bushings being directed so that the lower forward part of the rear wheel is adapted to be displaced inwardly with respect to the vehicle body.

3. A vehicle rear suspension mechanism as defined in claim 1 or 2 in which the intersectional line between the plane including the centers of said ball joint and said bushings and the vertical plane including the central axis of the rear wheel is offset from both the treading point and the center of the rear wheel at their respective heights.

4. A vehicle rear suspension mechanism as defined in claim 3 in which said intersectional line is offset inwardly from the center of the rear wheel at the height thereof and outwardly from the treading point at the height thereof and said first and second bushings permit a forward rotational displacement of the wheel hub relative to said body side support member, the central axis of said first bushing being directed to inwardly displace the lower forward part of the rear wheel with respect to the vehicle body upon occurrence of the forward rotational displacement of the wheel hub.

5. A vehicle rear suspension mechanism as defined in claim 4 further comprising a stopper means forming part of at least one of said first and second resilient bushings for limiting a rearward rotational displacement of the wheel hub.

6. A vehicle rear suspension mechanism as defined in claim 3 in which said intersectional line is offset outwardly from the center of the rear wheel at the height thereof and outwardly from the treading point at the height thereof, and said first and second bushings permit a rearward rotational displacement of the wheel hub relative to said body side support member, the central axis of said first bushing being directed to inwardly displace the lower forward part of the rear wheel with respect to the vehicle body upon occurrence of the rearward rotational displacement of the wheel hub.

7. A vehicle rear suspension mechanism as defined in claim 6 further comprising a stopper means forming part of at least one of said first and second resilient bushings for limiting a forward rotational displacement of the wheel hub.

8. A vehicle rear suspension mechanism as defined in claim 3 in which said intersectional line is offset inwardly from the center of the rear wheel at the height thereof and inwardly from the treading point at the height thereof, and said first and second bushings permit a forward rotational displacement of the wheel hub relative to said body side support member, the central axis of said first bushing being directed to inwardly displace the lower forward part of the rear wheel with respect to the vehicle body upon occurrence of the forward rotational displacement of the wheel hub.

9. A vehicle rear suspension mechanism as defined in claim 6 further comprising a stopper means forming part of at least one of said first and second resilient bushings for limiting a rearward rotational displacement of the wheel hub.

* * * * *